Figure 1:
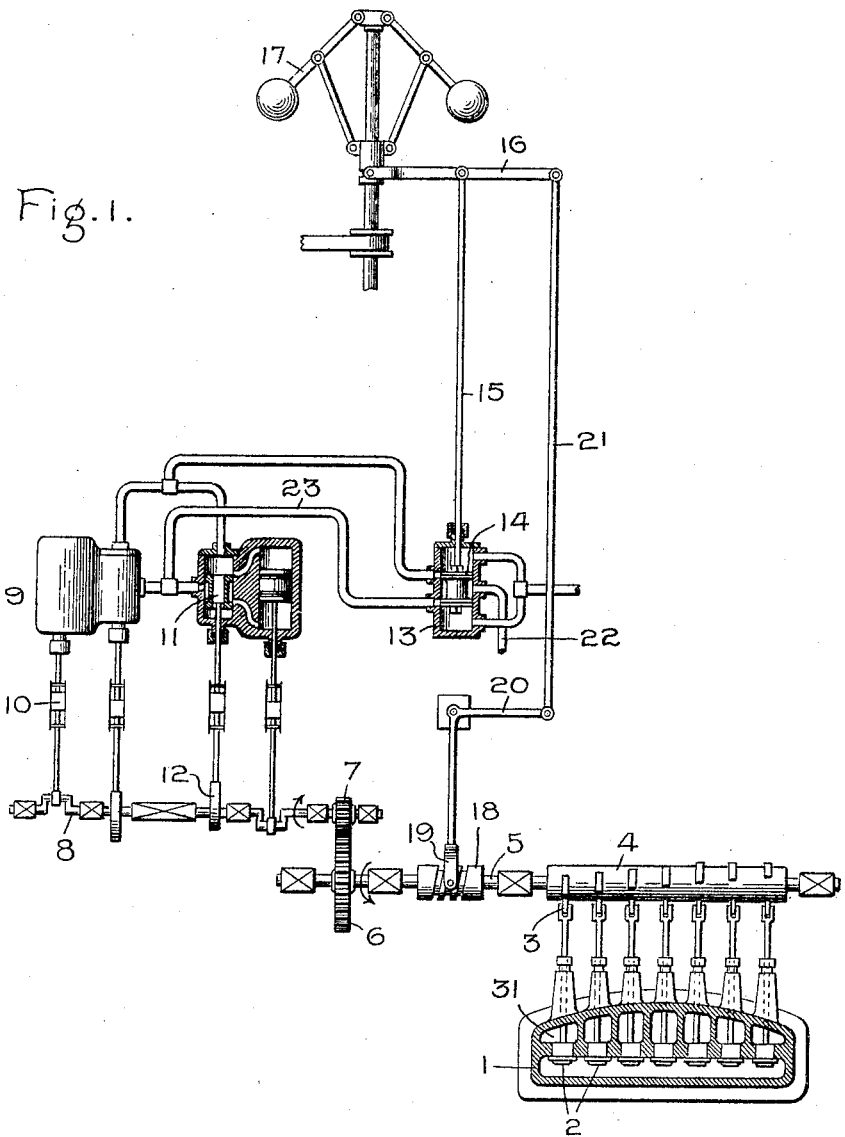

No. 796,518. PATENTED AUG. 8, 1905.
O. JUNGGREN.
GOVERNING MECHANISM FOR TURBINES.
APPLICATION FILED JAN. 15, 1904.

2 SHEETS—SHEET 1.

Witnesses:
Marcus L. Byng.
Helen Orford

Inventor:
Oscar Junggren,
by Albert G. Davis
Att'y.

No. 796,518. PATENTED AUG. 8, 1905.
O. JUNGGREN.
GOVERNING MECHANISM FOR TURBINES.
APPLICATION FILED JAN. 15, 1904.

2 SHEETS—SHEET 2.

Witnesses:
Marcus L Byng
Helen Orford

Inventor:
Oscar Junggren,
by Albert H Burns
Att'y.

UNITED STATES PATENT OFFICE.

OSCAR JUNGGREN, OF SCHENECTADY, NEW YORK, ASSIGNOR TO GENERAL ELECTRIC COMPANY, A CORPORATION OF NEW YORK.

GOVERNING MECHANISM FOR TURBINES.

No. 796,518.　　　Specification of Letters Patent.　　　Patented Aug. 8, 1905.

Application filed January 15, 1904. Serial No. 189,138.

*To all whom it may concern:*

Be it known that I, OSCAR JUNGGREN, a citizen of the United States, residing at Schenectady, in the county of Schenectady and State of New York, have invented certain new and useful Improvements in Governing Mechanism for Elastic-Fluid Turbines, of which the following is a specification.

The present invention relates to the governing means employed to admit motive fluid to or cut it off from an elastic-fluid turbine, and has for its object to provide an effective governor which is quick and positive in its action, is composed of relatively few and simple parts, and which reduces to a minimum the load on the weights or speed-responsive device.

In carrying out my invention the nozzle or nozzles or other discharging devices of the turbine are divided into sections or groups, each section or group containing one or more fluid-carrying passages, as desired. Some or all of these passages are provided with valves, as the conditions demand, which valves are arranged to be lifted positively and preferably against the steam-pressure in the chest. This latter arrangement has the advantage of insuring their closing when permitted to do so by the governor. The valves can with advantage be of the puppet type, such as are used on gas-engines, since they are capable of high frequency of operation without injury. The valves may be located in a common chest, which is the simplest arrangement, or they may be arranged singly or in groups, as desired. A number of valves more or less great is arranged with a common actuator which moves the valves relatively to their seats in the proper and determined sequence. The actuator may take the form of a cam, and as the cam is moved at any desired rate of movement the proper valve or valves are opened or closed, as the case may be, to meet the conditions of service. In order to move the actuator without unduly loading the centrifugally-acting weights or other device which is responsive to speed variations and which is the primary controlling means of the governor system, a motor capable of forward and reverse motion is provided, which is normally stationary when not engaged in moving the valves and has a large starting torque. The employment of such a motor means that it is only consuming energy when needed. Between the motor and the valve-actuator is a driving connection of suitable character, which positively transmits motion from the former to the latter. It is preferable, although not necessary, that the connection include some sort of a speed-reducing device. Such an arrangement means, of course, that the effective action of the motor is somewhat slower, but its effective torque greater. The motor can with advantage be of the fluid-actuated type, either rotary or rectilinear, since these are capable of starting quickly with good torque under conditions of maximum load. The motor may with advantage be operated by the same fluid which operates the turbine, or it may be operated by some separate source of fluid-pressure, such as the lubricant-supply to the turbine-bearings. Under certain conditions an electric motor may be employed instead. The motor is under the control of a valve or equivalent device, which in turn is regulated by the governor-weights or other device responsive to speed variations. The valve when stationary in the central or intermediate position covers without overlap the two inlet-ports of the motor and when shifted in one way or the other admits fluid in a direction to cause forward or reverse motion and at the same time exhausts the opposite end of the cylinder. With such an arrangement there would be a tendency for the parts to overtravel—that is to say, too much or too little motive fluid would momentarily be admitted to the turbine, resulting in a seesaw action in shaft speed, which is detrimental. To obviate this, an antihunting device is provided, which is actuated directly or indirectly by the motor for moving the valve or equivalent device to the off or neutral position, and thus stopping the motor. The antihunting device is so constructed and arranged that it is operative irrespective of the direction of motion of the motor and in this sense is double-acting. In this manner the motor is made to anticipate the governor-weights and by so doing prevent the objectionable overtravel or hunting. In event of using the turbine-lubricating fluid for operating the motor it is advantageous to provide a weight or equivalent device for returning the valve-actuator to the off position in case the supply of fluid fails.

The constructions above described have the advantage of eliminating all uncertainty of the valves opening or closing, and they also dispense with the needle-valve and springs commonly employed. Another important and decided advantage is that there is a total absence of pounding, which is so objectionable in valves which are permitted to open and close solely by elastic-fluid pressure.

The invention is more especially adapted for use in connection with a turbine working on the impact or jet principle; but since its action is not dependent upon the form of the turbine I do not wish to be understood as limiting myself in this particular.

I have illustrated only a single set of valves under the control of the reversible motor; but more sets can be added, if desired, and these distributed between the different stages. Instead of having all of the valves shown in the drawings control passages leading to one stage of a multistage machine they may go to two or more stages.

Figure 2:
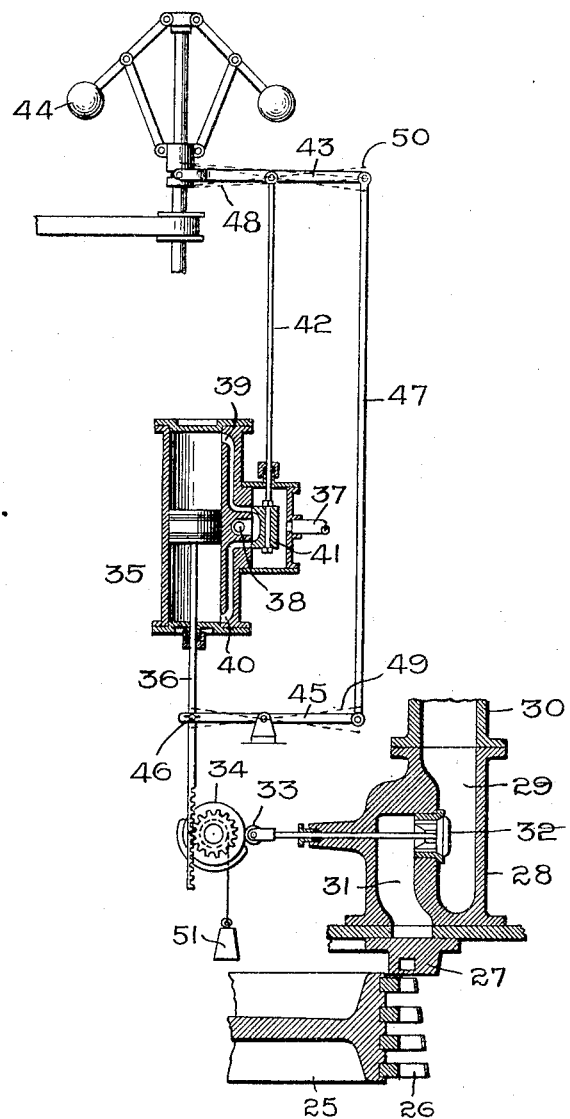

In the accompanying drawings, which illustrate an embodiment of the invention in a more or less diagrammatic manner for the sake of clearness, Figure 1 is a view of a valve mechanism with a pair of reversible reciprocating engines for opening and closing the valve in response to change of position of a speed-responsive device, and Fig. 2 represents a similar arrangement wherein the motor-piston is connected to the valve-actuator by a rack and pinion and makes only one complete stroke in moving the valves from the closed to the open position.

1 represents a steam-chest in which is a plurality of independent and separately-actuated valves 2. Each of these valves is provided with a stem which carries an antifriction-roller 3 at the outer end, that engages with a projection on the cam 4. Around each stem is a suitable stuffing-box for preventing the escape of motive fluid. The arrangement of projections on the cam is such that when a projection engages with a roller it raises the valve from its seat and when the roller passes off the projection the pressure of the steam within the steam-chest is sufficient to cause the valve to close. Each valve regulates the admission of motive fluid to one or more passages leading to nozzles or nozzle-sections. This is more apparent from Fig. 2. The cam is mounted on a shaft 5, which is supported by suitable bearings. On one end of the shaft is a spur-gear 6, which engages with a pinion 7, that is driven by the main crank 8 of a quick-acting reversible motor or steam-engine 9. In the illustration is shown a two-cylinder engine with the pistons connected to the crank and displaced by ninety-degrees. Each piston-rod is guided by a cross-head 10, and admission to each cylinder is controlled by a balanced valve 11, which is under the control of an eccentric 12.

The motor is under the control of a regulator, which is capable of stopping the motor or starting it up in a forward or backward direction. The regulator in the illustration comprises a cylinder 13 and a balanced piston-valve 14, the latter being connected by a rod 15 with the governor-lever 16. Mounted on the turbine-shaft or connected thereto in such a manner as to be responsive to speed variations is a governing device 17, comprising a pair of weights which move toward and away from the axis of their supporting-shaft in response to changes in speed in order to prevent overtravel of the parts. An antihunting or follow-up device is provided which acts to bring the regulator-valve 14 to a neutral position whenever the cam-actuator is moved the necessary amount to compensate for change in load. This comprises a cylindrical piece 18, mounted on the cam-shaft and provided with a coarse screw-thread, in which travel rollers mounted in the fork 19, that is carried by the bell-crank lever 20. The opposite end of the lever is connected by a rod 21 with the governor-lever 16.

The action of the apparatus is as follows: Assume that a part of the valves are closed and a part open and that the load increases, which means that additional motive fluid is required by the turbine. The governor-ball 17 would drop momentarily, due to the increase of load, which would cause the regulator-valve 14 to drop slightly. This would then admit fluid from the inlet-pipe 22 into the cylinder, and it would pass from the latter to the reversing-engine by the pipe 23. The position of the valve 11 for the engine is such that steam would pass into the lower end of the cylinder and push the piston upward. Pushing the piston upward causes the crank-shaft to be rotated in the direction of the arrow and the cam-shaft to be rotated in the opposite direction, which causes one or more of the admission-valves 2 to open and admit steam or other motive fluid to the turbine. As soon as the cam-shaft starts into rotation the rollers in the fork 19 engaging with the screw-thread in the cylindrical piece 18 impart motion to the lever 20, which in turn communicates its motion to the valve-actuating rod 15 in a manner to cause it to close the regulating-valve 14 and stop the motor.

Referring to Fig. 2, 25 represents one of the wheels of an elastic-fluid turbine, which is provided with buckets 26 of suitable form, which may be attached to the wheel in any desired manner and in any suitable position. Situated in the proper position to discharge motive fluid to the buckets is a nozzle or other discharging device 27, which receives motive fluid from the valve 28. The latter is provided with a chamber 29, that communicates with the inlet-pipe 30 and into which all of the valves open, and a plurality of passages 31, some or all of which are provided with individually and separately actuated valves 32. Each of the valve-stems is provided with an antifriction-roller 33, which engages with a projection on the cam 34. These projections are arranged to open the valve against the pressure of the motive fluid in the valve-chest. Motion is imparted to the cam in response to speed variations by a fluid-actuated motor 35, comprising a cylinder and a piston, the latter being connected by a rod 36 and rack with a pinion on the end of the cam-shaft. The cylinder is provided with an inlet-pipe 37 and an exhaust-port 38. Leading to opposite ends of the cylinder are ports 39 and 40, which ports are under the control of a regulating-valve 41, that in the neutral position covers the ports, but has no overlap. This regulator is connected by a rod 42 with the governor-lever 43, which is acted upon by the governor-weights 44.

In order to prevent overtravel of the parts, a follow-up or antihunting device is provided comprising a lever 45, which is pivoted at a point between its ends and on the left is provided with a slot in which moves the pin 46, that is secured to the piston-rod 36. The opposite end of the lever is connected to the governor-lever by a rod 47. The action of this part of the construction is as follows: Assume that the governor-weights fall until the governor-lever occupies the position indicated by the dotted line 48. This will cause the regulator-valve to open and admit fluid under pressure to the upper end of the cylinder and force the piston downward. This action causes the lever 45 to assume the position shown by dotted line 49 and the governor-lever to assume the position shown by dotted line 50, which will bring the regulating-valve to the neutral position and stop the motor. It will be seen that the follow-up device is actuated by the motor itself and in this manner anticipates any change in position of the fly-ball governor. The weight 51 will cause the valves to close if the source of supply for the motor fails.

In accordance with the provisions of the patent statutes I have described the principle of operation of my invention, together with the apparatus which I now consider to represent the best embodiment thereof; but I desire to have it understood that the apparatus shown is merely illustrative and that the invention can be carried out by other means.

What I claim as new, and desire to secure by Letters Patent of the United States, is—

1. In a governor for elastic-fluid turbines, the combination of a valve, an actuator for the valve, which moves it positively, a normally stationary motor for moving the actuator, a speed-responsive device for starting and stopping the motor, and an antihunting device.

2. In a governor for elastic-fluid turbines, the combination of a valve, an actuator for the valve, which moves it positively, a normally stationary motor, a driving connection between the motor and the actuator, a speed-responsive device for regulating the action of the motor, and a means acted upon by the motor itself for modifying the action of the said device.

3. In a governor for elastic-fluid turbines, the combination of a valve, an actuator therefor, a motor which is capable of forward or reverse motion and is connected to the actuator, a regulator which starts and stops the motor and determines its direction of motion, and a device responsive to speed variations, which moves the regulator.

4. In a governor for elastic-fluid turbines, the combination of a valve, an actuator therefor, a motor capable of forward and reverse motion, a power-transmitting connection between the motor and actuator, a regulator which stops the motor and starts it in one direction or the other to open or close the valve, and a governing device for controlling the action of the regulator.

5. In a governor for elastic-fluid turbines, the combination of a valve, an actuator therefor, a motor capable of forward and reverse motion, a power-transmitting connection between the motor and actuator, a regulator which stops the motor and starts it in one direction or the other to open or close the valve, a governing device for controlling the action of the regulator, and a means movable in response to changes in position of the motor for modifying the action of the governing device.

6. In a governing mechanism for elastic-fluid turbines, the combination of nozzles or discharge-orifices, valves controlling the passage of fluid through the nozzles or orifices, a reversible motor for actuating all of the valves, which is normally stationary, and a means responsive to speed changes for causing the motor to move in one direction or the other.

7. In a governing mechanism for elastic-fluid turbines, the combination of a plurality of valves, an actuator for opening or closing the valves in a predetermined order, a reversible motor which is normally stationary for moving the actuator, a regulator for stopping or starting the motor either in a forward or backward direction, and a means acted upon by the motor for moving the regulator to a neutral position when the proper valve or valves have been opened or closed.

8. In a governing mechanism for turbines, the combination of a plurality of individual valves working against the pressure of the motive fluid supplied to the turbine, a means for opening the valves against the pressure when moved in one direction and permit them to seat under the action of the fluid when moved in the opposite direction, and a reversible motor for moving said means in one direction or the other.

9. In a governing mechanism for turbines, the combination of a plurality of individual valves working against the pressure of the motive fluid supplied to the turbine, a means for opening the valves against the pressure when moved in one direction and permit them to seat under the action of the fluid when moved in the opposite direction, a reversible motor for moving said means in one direction or the other, a cam for opening the valves and permitting them to close under the pressure of the motive fluid, a motor for moving the cam, and a means moving with the cam to stop the motor.

10. In a governor for elastic-fluid turbines, the combination of a valve, a cam for actuating the valve, a reversible motor, gearing between the motor and the cam, a regulator for the motor, a speed-responsive device which moves the regulator, and a means movable with the cam for moving the regulator to a position to stop the motor.

11. In a governing mechanism for elastic-fluid turbines, the combination of a plurality of admission-valves which have an open and a closed position but no intermediate, a reversible fluid-actuated motor for moving the admission-valves in a predetermined sequence, a regulating-valve for stopping the motor and starting it forward or backward, and a speed-responsive device which controls the regulating-valve.

12. In a governing mechanism for elastic-fluid turbines, the combination of an admission-valve, a reversible fluid-actuated motor for moving the admission-valve, a regulating-valve for stopping the motor and starting it forward or backward, a speed-responsive device which controls the regulating-valve, and a means varying in position with that of the valve for modifying the action of the speed-responsive device.

13. In a governing mechanism for elastic-fluid turbines, the combination of a plurality of admission-valves, a chest which is common to the valves, a cam for raising the valves against the pressure in the chest, a quick-acting reversible engine for moving the cam, a regulating-valve for stopping the engine and starting it in one direction or the other, and a means moved by the forward or reverse motion of the engine for moving the regulating-valve to a position where it will cut off the supply of fluid to the engine.

14. In a governing mechanism, the combination of an admission-valve, a reversible motor for actuating it, a regulator for causing the motor to stop or move forward or backward, and a means for closing the valve in case the source of supply to the motor fails.

15. In a governing mechanism for turbines, the combination of an admission-valve, a reversible motor for actuating it, a regulator for the motor, a speed-responsive device, a means connecting the regulator and the device, and a lever moved by the motor, which acts on the regulator through the said means.

16. In a governor for elastic-fluid turbines, the combination of a valve, a reversible motor for opening and closing the valve, and a double-acting antihunting device for controlling the motor.

17. In a governor for elastic-fluid turbines, the combination of a plurality of valves, an actuator therefor, a reversible motor for moving the actuator in one direction or the other, and an antihunting device which acts on the motor during its forward and backward movements.

18. A governor for elastic-fluid turbines, comprising a plurality of individual valves and an actuator therefor, in combination with a reversible motor which moves the actuator in one direction or the other as the demand for motive fluid changes.

19. A governor for elastic-fluid turbines, comprising a plurality of nozzle passages or orifices discharging against the wheel-buckets of the same turbine, valves which control the passage of motive fluid therethrough, a fluid-actuated motor arranged to open all of the valves in predetermined order when moved in one direction and to close the valves in like order when moved in the opposite direction, and a valve for controlling the motor that moves in response to changes in speed of the wheel-buckets.

20. In a governing mechanism for turbines, the combination of a plurality of individual valves, a means for actuating the valves one after the other, a reversible motor for driving the means, and a single regulating device which brings the motor to a standstill each time a valve is opened or closed.

21. In a governing mechanism for turbines, the combination of a number of devices discharging motive fluid against the wheel-buckets of the same turbine, individual valves controlling the passage of fluid through the devices, a reversible motor, a means intermediate the valves and motor for actuating them in a predetermined sequence either to open or close, a controller for the motor, and a load-responsive device for moving the controller.

22. In a governor for turbines, the combination of a plurality of passages discharging motive fluid against the wheel-buckets of the same turbine, a plurality of individual valves which have an open and a closed position but no intermediate for controlling the passages, a motor capable of forward and reverse motion which furnishes the power for actuating the valves, means intermediate the valves and the motor for positively moving the former in a predetermined order, a valve for regulating the motor, and a governor for moving the regulating-valve.

23. In a governing mechanism for turbines, the combination of a number of fluid-discharging devices, individual valves controlling the passage of fluid through the devices, a reversible motor, a means intermediate the valves and motor for actuating them in a predetermined sequence either to open or close, a controller for the motor, a load-responsive device for moving the controller, and a means for preventing overtravel of the motor.

In witness whereof I have hereunto set my hand this 14th day of January, 1904.

OSCAR JUNGGREN.

Witnesses:
 EDWARD WILLIAMS, Jr.,
 HELEN ORFORD.